United States Patent
Grobelny et al.

(10) Patent No.: US 7,250,143 B2
(45) Date of Patent: Jul. 31, 2007

(54) DEVICE FOR SPRAYING WATER

(75) Inventors: Günter Grobelny, Herne (DE); Robert-Joachim Keck, Hermaringen (DE)

(73) Assignee: Balke-Durr GmbH, Ratingen (DE)

(*) Notice: Subject to any disclaimer, the term of this patent is extended or adjusted under 35 U.S.C. 154(b) by 0 days.

(21) Appl. No.: 11/050,868

(22) Filed: Feb. 7, 2005

(65) Prior Publication Data
US 2006/0060087 A1    Mar. 23, 2006

(30) Foreign Application Priority Data
Feb. 6, 2004   (EP) .................. 04002728

(51) Int. Cl.
*B01J 8/02* (2006.01)
*B01J 15/00* (2006.01)
(52) U.S. Cl. ............ 422/211; 422/129; 376/277; 376/301; 96/204; 96/155; 423/580.1
(58) Field of Classification Search ........... 422/211, 422/151, 194; 96/204, 155; 423/580.1; 376/277, 301
See application file for complete search history.

(56) References Cited

U.S. PATENT DOCUMENTS

| 2,671,524 A | 3/1954 | Gilwood |
| 6,527,942 B2 | 3/2003 | Puthawala ............ 205/743 |
| 2002/0025462 A1* | 2/2002 | Nakanishi et al. .......... 429/19 |

FOREIGN PATENT DOCUMENTS

| DE | 42 30 054 | 3/1994 |
| DE | 198 22 203 | 11/1999 |
| GB | 1 258 998 | 1/1972 |

* cited by examiner

*Primary Examiner*—Glenn Caldarola
*Assistant Examiner*—Kaity Handal
(74) *Attorney, Agent, or Firm*—Baker & Hostetler LLP

(57) ABSTRACT

The invention concerns a device for spraying water in a feedwater tank of a thermal power plant. Because the spraying device comprises a catalyst for the conversion of the gases contained in the water, the gases released from the water during the spray degasification can be removed easily, reliably and completely. Thus, the degree of efficiency of the thermal circuit of the power plant and the lifespan of the components arranged in the circuit are increased.

9 Claims, 2 Drawing Sheets

DEVICE FOR SPRAYING WATER

CROSS REFERENCE TO RELATED APPLICATIONS

This application claims priority to European Patent Application Serial No. 04002728.6, filed Feb. 6, 2005, titled DEVICE FOR SPRAYING WATER, the disclosure of which is incorporated by reference in its entirety.

FIELD OF THE INVENTION.

The invention concerns a device for spraying water in a feedwater tank of a thermal power plant.

BACKGROUND OF THE INVENTION.

It is known that thermal power plants have a water-steam circuit (thermal circuit) in which a feedwater tank is arranged among other things. The feedwater tank is used for storing and reconditioning the water that is circulating in the thermal circuit. The degasification of the water is particularly important during the reconditioning process.

In all thermal power plants a most complete degasification possible of the feedwater is indispensable for reliable and safe operation and also for achieving the highest efficiency of the plant. The gases to be removed include particularly the gases that are not condensable at the temperature prevailing in the feedwater tank such as for example oxygen and carbon dioxide. Furthermore, especially in a nuclear power plant of the boiling-water reactor type, hydrogen and oxygen, also called photolysis gases, are formed by the effect of the radioactive radiation on the feedwater that is circulating through the reactor pressure vessel.

The oxidizing properties of the oxygen lead to corrosion and thus damages to all the components of the thermal circuit. These damages drastically reduce the lifespan of the components. Moreover, the hydrogen gas that results from photolysis presents an enormous safety risk, because it is highly flammable and forms particularly with the existing oxygen gas a highly explosive mixture, the so-called detonating gas. However in order to ensure a safe operation of the boiling-water reactor, the resulting photolysis gas must be removed as completely as possible from the feedwater.

One alternative for removing hydrogen and oxygen from the water contained in a primary circuit of a nuclear power plant is the conversion of both the gases by means of catalytically active surfaces according to the patent application DE 3614267 A1.

In another process of the so-called spray degasification, the water containing the gases is sprayed above the feedwater present in the feedwater tank in the form of the finest water droplets and brought in contact with hot steam, the so-called extraction steam. The heat exchange of the extraction steam with the sprayed colder water causes the gas dissolved in it to be released and removed from the thermal circuit by a suitable suction device. The spring-loaded water spray valve known from DE 10001297 can be used for spraying the water in the feedwater tank.

However the suction of the gases released by the spray degasification presents some fundamental problems. It has been seen in practice that the spray shield formed by the spraying of the water forms a relatively dense cover that interferes with the suction of the gases by the suction device arranged in the feedwater tank. An insufficient suction of the radiolysis gases leads to the afore-mentioned disadvantages and risks in the operation of the thermal circuit.

Also the even distribution of the water to be degasified by the spraying device and the even distribution of the extraction steam in the feedwater tank is considerably difficult due to the incomplete suction of the radiolysis gases. Thus the optimal efficiency of the spray degasification and ultimately of the entire thermal circuit cannot be achieved.

SUMMARY OF THE INVENTION.

Therefore the task of the invention is to specify a device of the afore-mentioned type with which the gases released from the water during the spray degasification are removed as easily, reliably and completely as possible and high efficiency of the thermal circuit is achieved.

This task is resolved by the device for spraying water in a feedwater tank of a thermal power plant in that said device has a catalyst for the conversion of the gases contained in the water.

Moreover, the term catalyst includes each body that is suitable for the conversion of the gases contained in the water by a chemical reaction, particularly the gases that are not condensable at the temperatures usually prevailing in the circuit. In doing so the gases should be as far as possible transferred in water or a compound easily soluble in water. Since the catalyst and the gases to be removed exist in different states the conversion involves the use of a heterogeneous catalyst.

The spraying device in accordance with the invention advantageously removes the gas contained in the feedwater simply by conversion. By the removal of the gases from the thermal circuit, the lifespan of the components arranged in it is clearly increased since corrosion, by oxygen for example, is no longer possible. Thus even the maintenance interval for the water-steam circuit also increases, thus bringing about cost advantages. The complete removal of the corrosive gases also results in higher operational safety of the thermal power plant.

Furthermore, the invention can considerably improve the removal of the gases compared with the known technique, which uses a separate device each for the spraying of water and for the suction of the released gases. Moreover while using the device in accordance with the invention the gas released from the sprayed water is converted by the catalyst close to the place of its formation without having to cover a longer distance to the suction device, as was the case in known two-part devices. By the improved removal of the gases compared with the prior art power drain in the thermal circuit can be reduced and thus ultimately the efficiency of the power plant can be increased.

Another advantage of the device in accordance with the invention compared with the prior art is lower costs because only one device is required for the removal of the gas in accordance with the invention while the known technique provides a separate device each for the spraying of water and suction of the gases.

The invention also advantageously enables an even distribution of the water to be degasified and the extraction steam in the feedwater tank. This leads to improved efficiency of the spray degasification and thus of the thermal circuit. Moreover, the device in accordance with the invention can be operated without the risk of an overload, due to which it rarely needs to be repaired as compared to conventional spraying devices. The down times of the power plant associated with maintenance are reduced, thus saving expenses.

Finally another advantage of the invention is that even existing spraying devices can be refitted with a catalyst with relatively low expenditure. Thus the advantages of the invention can also be cost-efficiently applied to already existing plants.

The first preferred design form of the invention provides for a catalyst that is designed to convert hydrogen and oxygen gas to water. Such a design of the catalyst is particularly of great advantage when the feedwater circulates in a nuclear power plant of the boiling-water reactor type. The mixture of hydrogen and oxygen formed by the effect of the radioactive radiation on the water is then converted safely to water by means of the catalyst that is arranged in the spraying device. In this way the highly inflammable hydrogen gas and also the highly explosive detonating gas mixture are withdrawn from the thermal circuit, thus increasing the operational safety of the power plant. Numerous metals and metalorganic compounds are known for use as catalysts for the conversion of the photolysis gases to water.

It is therefore particularly useful if the catalyst contains at least precious metal. Basically all precious metals known from prior art conversion of gases can be used. However, particularly preferred metals are those of the 8. subgroup of the Periodic Table of the Elements (Ni, Pd, Pt), particularly platinum. These metals can convert numerous gases catalytically and are also outstandingly suitable for the catalytic combustion of hydrogen and oxygen to water. In addition to one precious metal, even several precious metals for example, nickel and platinum can be present in the catalyst. The precious metals can be present in the catalyst either in parallel or also in the form of an alloy.

Another preferred design form of the invention provides a catalyst that is designed as bulk material. Such a catalyst can be manufactured easily and is characterized by a long life-span due to its robustness. The conversion of the gases contained in the water can thus take place reliably over a longer period of time.

It can also be useful if the catalyst is designed as a substrate with a catalytically active coating. The advantage of such a design form is that only the coating has to consist of a catalytically active material such as a precious metal, while the substrate can be manufactured from a considerably lower priced material. Materials known to prior art are used as substrates. These include metal oxides particularly $\gamma$-$Al_2O_3$, metal alloys, ceramics and refractory plastics. In this manner a cost-effective catalyst can be produced that ensures a reliable removal of the gases contained in the water.

In addition it can be advantageous if the catalyst has a sheet metal structure. In the following, the term sheet metal means a body whose thickness is small to its surface measurement. The sheet metal can be designed as a catalytically active bulk material or as a substrate for a catalytically active coating. Basically all structures known to prior art are applicable for the structure of the sheet metal. Thus the structure can be a regular or irregular sequence of elevations and depressions for example in the form of a wavy pattern or a jagged pattern. Even a relatively rough-textured surface, for example a dendritic coating, is possible while preparing a large active surface. In addition the sheet structure can form a multi-layer body, which further increases the catalytically active surface.

Moreover it can be particularly useful if the catalyst is designed as an expanding metal. The term expanding metal means a metallic body, which derives its structure in a known manner from an expansion process. Such a catalyst can be produced relatively easily with low material consumption and reliably ensures the removal of the gases contained in the water due to its large catalytically active surface.

Furthermore, a preferred design form of the invention provides a catalyst that is designed as wire gauze. Known wire gauzes can be used in which the individual wires are designed as bulk materials or as substrates with a catalytically active coating. Also it is fundamentally possible to have a multi-layer arrangement of wire gauze as a wire cloth. The advantages of the invention can be achieved by the relatively large surface.

A preferred design form also provides a catalyst that is designed at least as one modular element. The element can be exchanged at low expense for example if this is necessary due to pollution or depletion of the active surface. Furthermore, the advantage of the use of several elements is that the catalytically active surface can be easily determined by the number of the elements arranged in the spraying device. The modular element can be designed as a catalyst in each of the above-described forms.

A preferred design form of the invention provides the spraying device with at least one spray area comprising spray openings and the catalyst is arranged directly near the spray area. The term spray area means that area of the spraying device by means of which the spraying of the water to be degasified takes place. For this purpose a multitude of spray openings are provided in the spray area. A spraying device in accordance with the invention has one or even several such spray areas.

Since the catalyst is arranged directly near the spray area the gas released from the sprayed water can be converted close to the place of its formation and be removed from the thermal circuit. This means that the catalyst is arranged as close as possible to the spray area in keeping with the constructed space required for the spray area. The closer the catalyst is arranged to the spray area, the more complete and quicker the removal of the gases released from the water is. Additionally, the arrangement of the catalyst directly near the spray area advantageously results in a relatively smaller construction space for the spraying device in accordance with the invention.

It is particularly useful if the catalyst is arranged in a longitudinal direction of the spraying device above the spray area. Such an arrangement leads to a particularly good and reliable removal of gases because after being released from the sprayed water these gases flow upward due to their low density and the longitudinal direction of the spraying device and are converted there by the catalyst. The tendency of the gases to concentrate in colder areas of the feedwater tank also plays a role here. Since the catalyst is located in a local supercooling zone above the spray area due to the extraction steam that flows in the longitudinal direction of the spraying device from the bottom to the sprayed water, the gases to be removed concentrate in the area of the catalyst and can be removed reliably.

In addition it is particularly advantageous if the catalyst is arranged on an outwardly directed side of the spraying device. Thus the gases to be removed flow to the catalyst particularly well and get converted there quickly. Although every outwardly directed side of the spraying device is suitable for the conversion of the gases, one outwardly directed side that lies above the spray area is particularly preferred due to the above-mentioned reasons.

Another advantageous design form of the invention provides a catalyst that is arranged in a spraying device with at least two spray areas instead of one. Thus it is particularly easy to design a spraying device with at least two spray areas in accordance with the invention. For this purpose instead of the spray area the catalyst is arranged in the construction area that is provided for one of the two spray areas. This catalyst is designed in accordance with the predetermined construction space such that it fits into the place without any problems. Even the subsequent alteration of an existing spraying device with at least two spray areas to a device in accordance with the invention is possible in a particularly useful manner. A device in accordance with the invention can also be altered to a spraying device without a catalyst.

Furthermore, it is particularly useful if the spraying device is cylinder-symmetrical. The individual components of a cylinder-symmetrical device can be manufactured with particular ease thus lowering the manufacturing costs. Furthermore a cylinder-symmetrical spraying device is also compatible with the holding device such as a connecting flange that is usually provided for the arrangement of a spraying device in the feedwater tank. This preferred design form of the invention can be advantageously used for new as well as for already existing plants.

Moreover, a cylinder-symmetrical spraying device in accordance with the invention has a favorable surface to volume ratio that characterizes a cylinder. As a result it is also preferred that the catalyst is arranged in the area of the cylinder covering. Thus a relatively large outwardly directed catalyst surface can be made available that is proportionate to the entire construction space of the spraying device. Apart from that by an arrangement in the area of the cylinder covering even catalyst surfaces that are not outwardly directed can be maximized. Even these catalyst surfaces can be made accessible for the gas to be removed by taking corresponding structural measures, for example, the catalyst can be provided with recesses or modular elements with interspaces. This leads to a reliable and even faster conversion of the gases.

In another preferred design form of the invention a tube is arranged in a radial direction between a cylinder axis and the catalyst. The tube extends in the axial direction and is designed to feed water to the spray area. The tube is arranged in the device because in a spraying device in accordance with the invention at least one spray area must be provided with the water to be degasified. In addition, the arrangement between the cylinder axis and the catalyst is particularly advantageous if the catalyst instead of a spray area is arranged in the area of the cylinder covering and the construction space available between the cylinder axis and the cylinder covering is used for the tube in a particularly space-saving manner.

At the same time by the relatively cold water flowing through the tube a local super cooling zone forms in the spraying device whose effect has been explained above and can be enhanced by arranging the tube and the catalyst above the spray area. Although a tube is particularly preferred due to the low flow resistance against the throughflowing water and easy manufacturing, even a hollow body can be used with another cross-section for conveying the water.

Finally a preferred design form of the invention provides for a catalyst that is arranged in the feedwater tank directly below its upper wall because the coldest area in a feedwater tank is located below its upper wall. Such an arrangement can be implemented with particular ease by arranging the catalyst in the spraying device above the spray area and arranging the spraying device with the area containing the catalyst directly below the upper wall of the feedwater tank. The gases to be converted concentrate on the supercooling zone and are thus removed from the thermal circuit by the catalyst present there efficiently and quickly.

BRIEF DESCRIPTION OF THE DRAWINGS.

In the following the invention has been explained further on the basis of a drawing. The figures illustrate schematically.

DETAILED DESCRIPTION.

Figure 1:
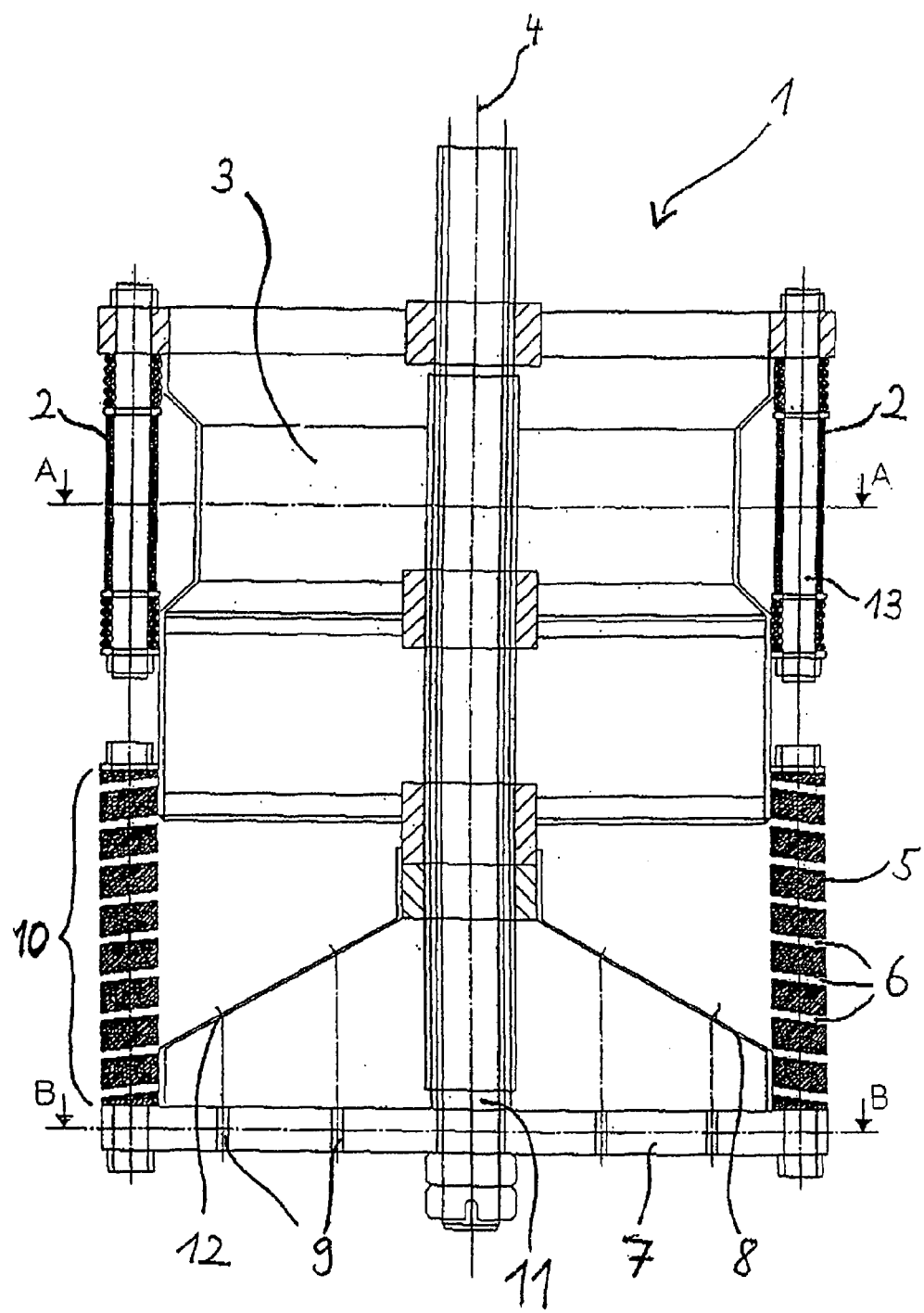
FIG. 1 a longitudinal section through a preferred embodiment of a spraying device in accordance with the invention.

FIG. 1 illustrates a spraying device 1 with which the water to be degasified in a feedwater tank of a thermal power plant sprays and with which the gas discharged from the water is converted by a catalyst. The spraying device 1 is orientated in accordance with FIG. 1 in the feedwater tank that is not illustrated, i.e. the water is sprayed by a spray area 10 that is arranged in the lower area of the spraying device 1 while the conversion of the gases takes place on the catalyst that is arranged in an upper area of the spraying device 1.

The spraying device 1 has a cylinder symmetry wherein the axial direction (longitudinal direction) is defined by an axis 4. The spray area 10 is provided for spraying the water to be degasified. This spray area 10 has a spray spring 5 in the covering area 30 of the spraying device 1. The spray spring 5 has spring slots 6 as spray openings.

For converting the gas discharged from the sprayed water the spraying device 1 in accordance with the invention comprises a catalyst that is arranged in the form of modular elements 2 above the spray area 10. In accordance with the preferred design form illustrated in FIG. 1, the elements 2 instead of a second spray area are arranged in the area of the cylinder covering 30. The illustrated design form is thus achieved from a spraying device with two sprays areas by alteration in which the upper spray area is replaced by the catalyst.

Figure 2:
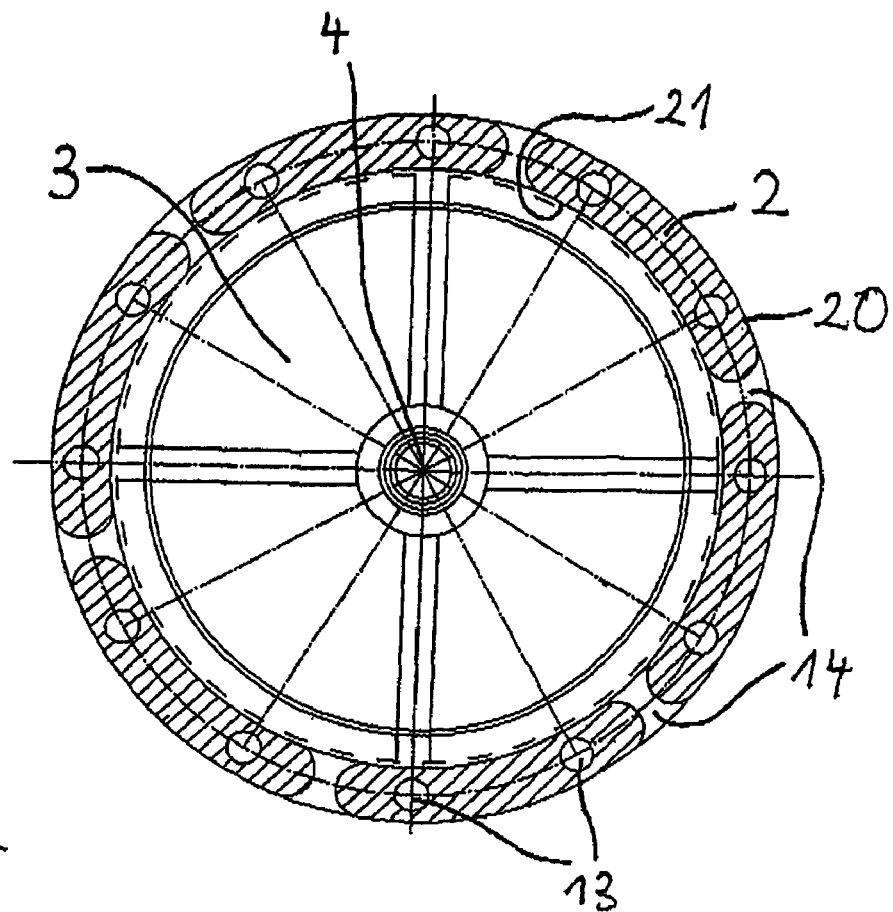
FIG. 2 illustrates a cross-section along line AA through the preferred embodiment in accordance with FIG. 1.

FIG. 2 illustrates the arrangement of the modular elements 2 in the spraying device in more detail. The elements 2 are designed corresponding to the curvature of the cylinder and in the area of the cylinder covering 30 (depicted in FIG. 1). The attachment is by means of two screws 13 per element 2 on the spraying device 1. Each element 2 has an outwardly directed side 20 and an inwardly directed side 21 wherein the difference between the cylinder radii of the outer side and of the inner side determines the density of the elements in the radial direction.

In order to make the size of the catalytically active surface for the conversion of the gases as large as possible, interspaces 14 are located between the elements 2. The gas to be converted flows through the interspaces 14 and can flow to the inner side 21 of the elements 2. The modular elements 2 contain platinum as the precious metal, which catalyzes particularly the conversion of hydrogen and oxygen to water. The preferred design form is thus particularly suitable to remove the photolysis gas forming in the feedwater of a nuclear power plant of the type of a boiling water reactor.

Figure 3:
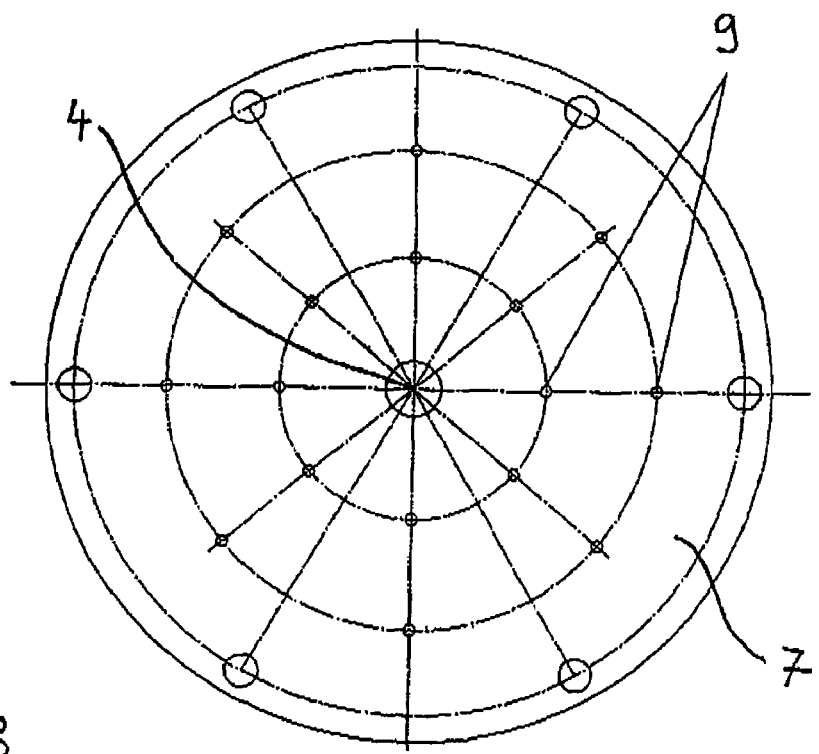
FIG. 3 illustrates a cross-section along the line BB through a preferred embodiment in accordance with FIG. 1.

During the operation of the device in accordance with the invention the water to be sprayed is conveyed by a tube 3 to the spray area 10. The tube 3 lies between the catalyst elements 2 and the axis 4. In the spray area 10 the water to be sprayed exerts a force on a base plate 7 via a conical cover sheet 8 depending on the pressure and quantity of the water. The force is directed downward in the direction of the cylinder axis 4 in FIG. 1. Both the cover sheet 8 and also the base plate 7 are provided in accordance with FIGS. 1 and 3 with a minimum amount of boreholes 12 and/or 9 in order to avoid an overload of the spraying device when particularly large quantities of water are to be sprayed.

Because the base plate 7 is springily supported via a tension rod 11 with a working spring (not illustrated) that is arranged above the spraying device, the base plate is moved downward by the pressure of the water in the direction of the cylinder axis 4. The spray spring 5 that is also attached to the base plate 7 is expanded by that and releases depending on the water pressure wide opened spring slots 6. The water to be degasified is conveyed by the spring slots 6 out of the spraying device 1 and forms a spray shield (not illustrated) comprising the finest water droplets. Hot steam (extraction steam) (also not illustrated) is conveyed to the spray shield. The hot steam releases the gases contained in it following the heat exchange with the essentially colder water droplets.

The gases that are released in the feedwater tank from the water droplets sprayed in this manner or by other degasification techniques flow upward due to their low density and flow into the area of the modular elements 2. Because relatively cold water is led through by the tube 3 that is arranged between the cylinder axis 4 and the catalyst elements 2, the tube 3 forms a local supercooling zone with the neighboring elements 2 inside the spraying device 1. The gases to be removed concentrate in this supercooling zone, from which they are removed quickly and completely out of the thermal circuit by the catalytically active surfaces of the elements 2.

This effect of the design of a supercooling zone that is advantageous for the removal of gases is further enhanced by arranging the catalytically active elements 2 of the spraying device 1 in the feedwater tank directly below its upper wall (not illustrated) i.e. in the coldest zone inside the feedwater tank.

The invention claimed is:

1. A device for spraying water and degasifying water, comprising:
   a cylinder having an upper area and a lower area that extends along a longitudinal axis, wherein said cylinder has a periphery that encircles the longitudinal axis;
   a tension rod that extends through said cylinder generally parallel to the longitudinal axis;
   at least one spray area with spray openings disposed on said lower area of said cylinder, wherein said spray area comprises a spray spring that is positioned about the periphery within the cylinder, within a covering area of the device, wherein the covering comprises a plate positioned at the top of said cylinder; a base plate mounted to said tension rod at a position along the longitudinal axis within the lower area;
   a conical cover sheet mounted to said tension rod above the base plate along the longitudinal axis; a catalyst for the conversion of the gases contained in the water wherein the catalyst is located in the upper area of the cylinder within the covering area; and wherein the catalyst is positioned above the spray openings in the longitudinal direction of the spraying device.

2. The spraying device in accordance with claim 1, wherein the catalyst is designed to convert hydrogen and oxygen to water.

3. The spraying device in accordance with claim 1, wherein the catalyst comprises at least one precious metal.

4. The spraying device in accordance with claim 1, wherein the catalyst is designed as at least one modular element.

5. The spraying device in accordance with claim 1, wherein the catalyst is arranged in a spraying device with at least two spray areas instead of one spray area.

6. The spraying device in accordance with claim 1, wherein the device is cylinder-symmetrical.

7. A device for spraying water and degasifying water, comprising:
   a cylinder having an upper area and a lower area that extends along a longitudinal axis, wherein said cylinder has a periphery that encircles the longitudinal axis; a tension rod that extends through said cylinder generally parallel to the longitudinal axis; at least one spray area with spray openings disposed on said lower area of said cylinder, wherein said spray area comprises a spray spring that is positioned about the periphery within the cylinder, within a covering area of the device, wherein the covering comprises a plate positioned at the top of said cylinder; a base plate mounted to said tension rod at a position along the longitudinal axis within the lower area; a conical cover sheet mounted to said tension rod above the base plate along the longitudinal axis; a catalyst for the conversion of the gases contained in the water wherein the catalyst is located in the upper area of the cylinder within the covering area; and wherein the catalyst is positioned above the spray openings and is arranged on one outwardly directed side of the spraying device.

8. A device for spraying water and degasifying water, comprising: a cylinder having an upper area and a lower area that extends along a longitudinal axis, wherein said cylinder has a periphery that encircles the longitudinal axis, and wherein the device for spraying is cylinder-symmetrical; a tension rod that extends through said cylinder generally parallel to the longitudinal axis; at least one spray area with spray openings disposed on said lower area of said cylinder, wherein said spray area comprises a spray spring that is positioned about the periphery within the cylinder, within a covering area of the device, wherein the covering comprises a plate positioned at the top of said cylinder; a base plate mounted to said tension rod at a position along the longitudinal axis within the lower area; a conical cover sheet mounted to said tension rod above the base plate along the longitudinal axis; a catalyst for the conversion of the gases contained in the water wherein the catalyst is located in the upper area of the cylinder within the covering area; and wherein the catalyst is positioned above the spray openings and is arranged in the area of the cylinder covering.

9. A device for spraying water and degasifying water, comprising: a cylinder having an upper area and a lower area that extends along a longitudinal axis, wherein said cylinder has a periphery that encircles the longitudinal axis; a tension rod that extends through said cylinder generally parallel to the longitudinal axis; at least one spray area with spray openings disposed on said lower area of said cylinder, wherein said spray area comprises a spray spring that is positioned about the periphery within the cylinder, within a covering area of the device, wherein the covering comprises a plate positioned at the top of said cylinder;
   a base plate mounted to said tension rod at a position along the longitudinal axis within the lower area; a conical cover sheet mounted to said tension rod above the base plate along the longitudinal axis; a catalyst for the conversion of the gases contained in the water wherein the catalyst is located in the upper area of the cylinder within the covering area; and wherein the catalyst is positioned above the spray openings and is arranged inside the feedwater tank directly below the covering area.

* * * * *